Oct. 7, 1969 W. W. QUIGLEY 3,471,656

TELEPHONE MOUNTING DEVICE

Filed Jan. 3, 1967 2 Sheets-Sheet 1

INVENTOR

WARREN W. QUIGLEY

BY Brown c, Schuyler & Beveridge

ATTORNEY

INVENTOR
WARREN W. QUIGLEY

BY Browne, Schuyler & Beveridge

ATTORNEY

United States Patent Office 3,471,656
Patented Oct. 7, 1969

3,471,656
TELEPHONE MOUNTING DEVICE
Warren W. Quigley, Forest Park, Ga., assignor to Gladwin Industries Inc., Atlanta, Ga., a corporation of Georgia
Filed Jan. 3, 1967, Ser. No. 606,728
Int. Cl. H04m *1/04*
U.S. Cl. 179—146 9 Claims

ABSTRACT OF THE DISCLOSURE

A one piece sheet metal plate for mounting coin telephones in a corner. Captive nuts are provided for mounting the telephone.

This invention relates to a novel mounting device for mounting a coin or public telephone to either corner of an associated enclosure or similar structure.

One of the objects of the present invention is to provide an improved mounting device that may be easily and securely attached to either corner of a telephone enclosure for mounting a telephone at that corner.

A further object of the present invention is to provide such a mounting device which highly facilitates mounting of the telephone thereto while having adequate provision for accommodating the telephone wires.

A still further object is to provide such a telephone mounting device which may be economically manufactured in mass production at relatively low cost.

Other objects and advantages of the present invention will be apparent from the following detailed description in conjunction with the attached drawings, in which.

Figure 1:
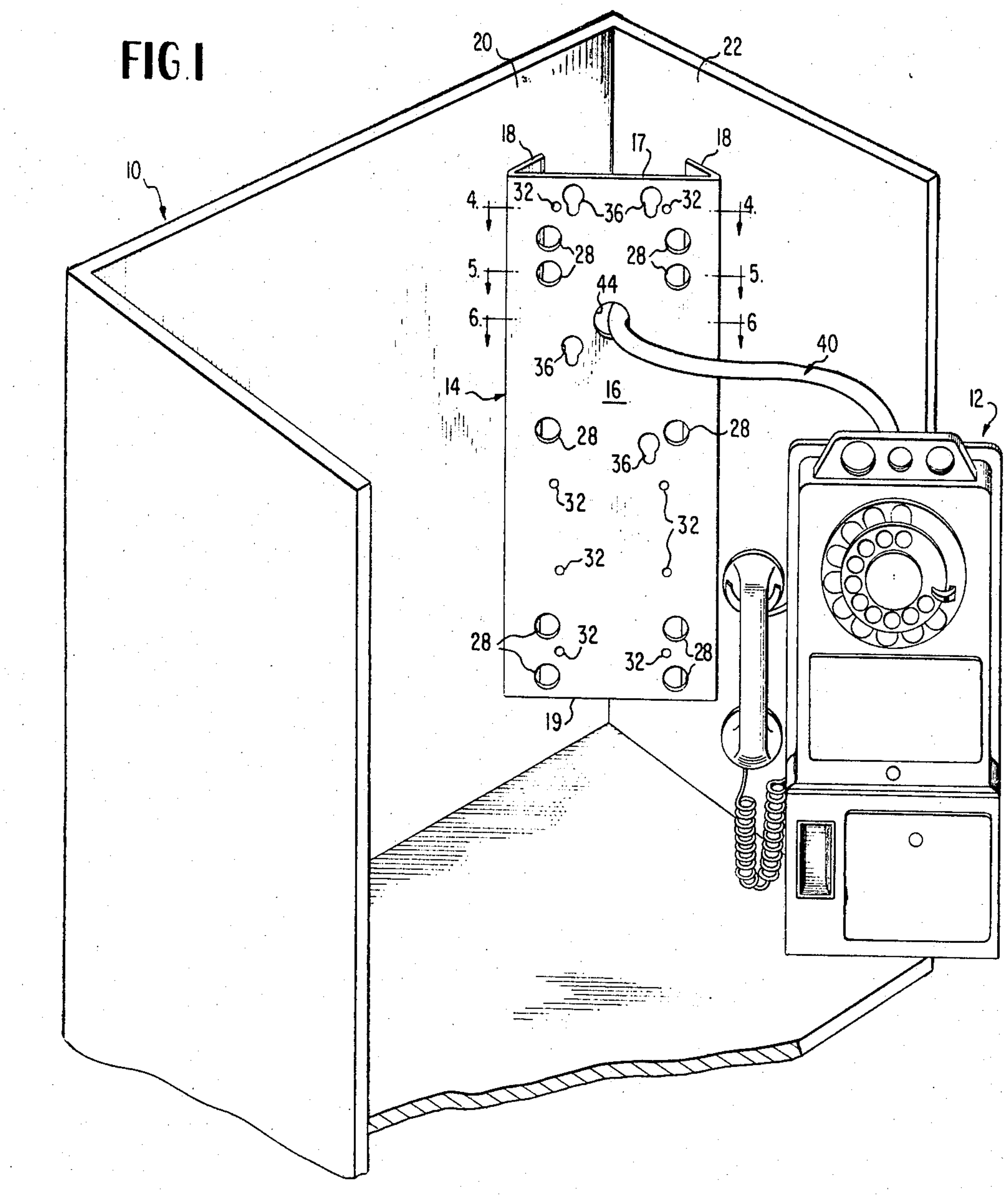
FIGURE 1 is an exploded perspective view of a public telephone installation embodying the mounting device of the present invention.
Figure 3:
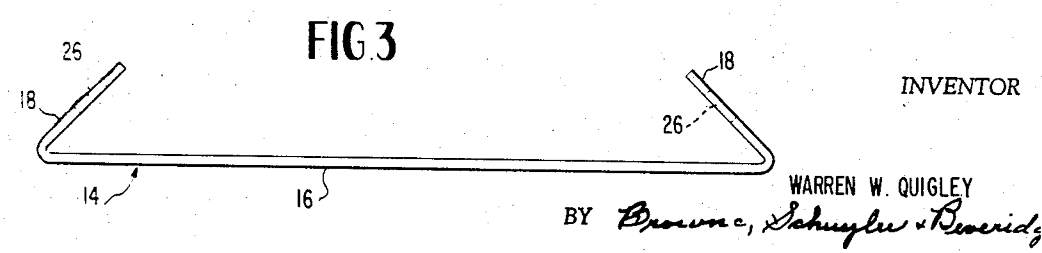
FIGURE 3 is an enlarged end view of the mounting device.
Figure 2:
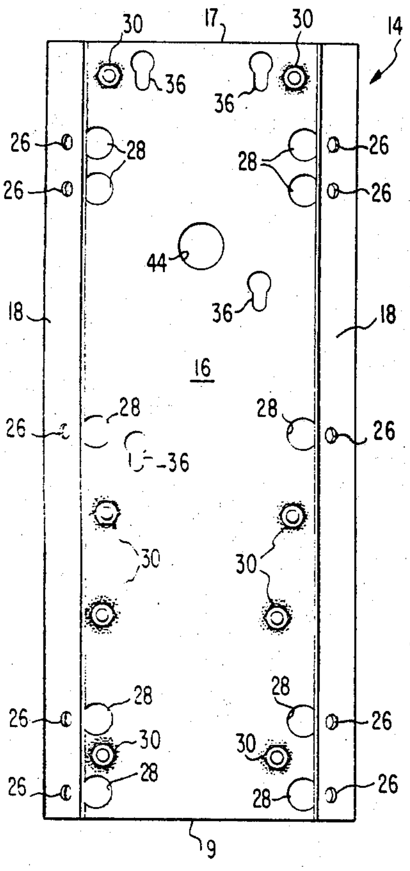
FIGURE 2 is a rear elevational view of the mounting device included in the installation of FIGURE 1.
Figure 4:
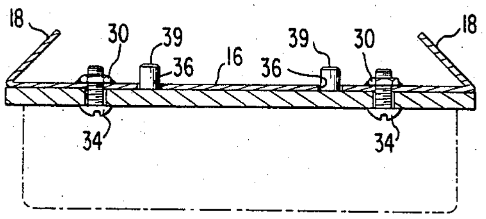
FIGURE 4 is an enlarged cross-sectional view of the mounting device taken generally along lines 4—4 of FIGURE 1.

Referring to the drawings in detail there is illustrated in FIGURE 1, a telephone enclosure generally designated 10 including a corner mounted coin telephone 12 secured to the enclosure by a mounting device 14 constructed in accordance with the present invention.

Figure 5:
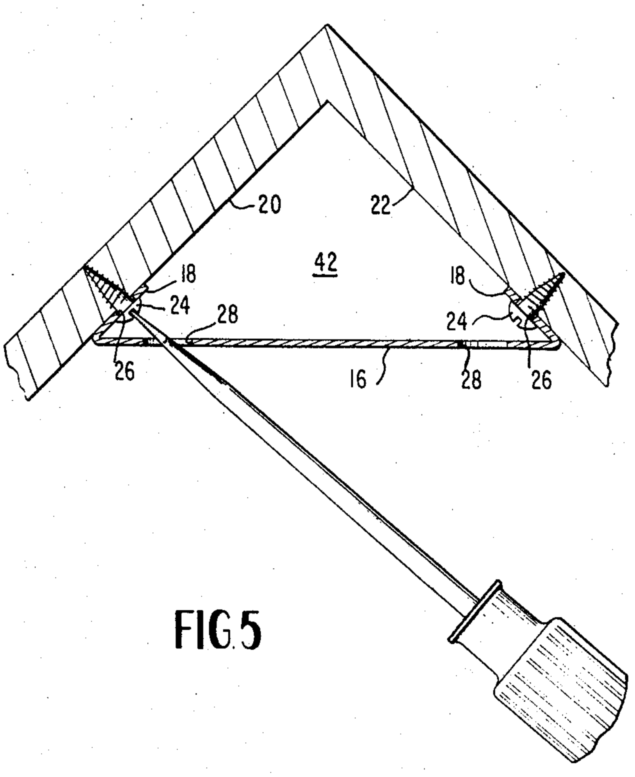
FIGURE 5 is an enlarged fragmental cross-sectional view taken generally along lines 5—5 of FIGURE 1 and additionally showing a screw driver positioned through the mounting device during installation or removal.
Figure 6:
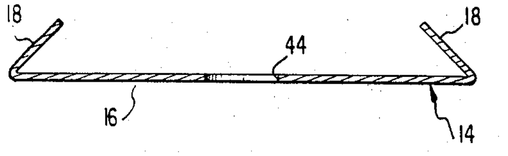
FIGURE 6 is an enlarged cross-sectional view taken generally along lines 6—6 of FIGURE 1.

In the preferred embodiment, mounting device 14 is made from eleven gauge sheet steel and includes a generally rectangular face plate or mounting portion 16 and opposite side flanges 18 bent inwardly and rearwardly at an angle of approximately forty-five degrees (45°) from the opposite sides of face plate 16. Additionally in the preferred embodiment face plate 16 has a length of approximately seventeen inches (17″) and a width of approximately seven inches (7″), and flanges 18 extend continuously between the opposite ends 17 and 19 of the face plate with a width of approximately one and one-quarter inch (1¼″). Flanges 18 serve to position the face plate 16 in the corner of the enclosure by engagement with the corner forming side walls 20, 22 of the enclosure as shown in FIGURE 5.

Securement of the mounting plate to the enclosure walls 20, 22 is effected by fasteners such as screws 24 received through apertures 26 formed in flanges 18 with the screws 24 engaged in the enclosure walls 20, 22. To provide access for installation or removal of the mounting plate from the enclosure, the face plate 16 is formed with apertures 28 adjacent the sides of the face plate and at the level of the apertures 26 in the flanges. Preferably each flange 18 has five screw receiving apertures 26 five-sixteenth of an inch (5/16″) in diameter, and face plate 16 has ten corresponding apertures 28 of greater diameter namely three-quarters of an inch (¾″) so as to allow sufficient space for installing or removing screws 24 at an angle to face plate 16 as illustrated in FIGURE 5.

Securement of the telephone on face plate 16 is achieved through nuts 30 shown as eight in number welded to the rear surface of face plate 16 respectively around apertures 32 formed through face plate 16. Fasteners such as bolts 34 from the rear of the telephone are passed through apertures 32 respectively and threaded into nuts 30 to secure the telephone flush on the face plate.

To initially position the telephone on the face plate prior to securement of fasteners 34, a plurality, preferably four, of key hole slots 36 are formed in the face plate with two slots spaced across the top of the face plate one slot at the right hand center portion and the remaining slot at a left hand portion intermediate the upper end 17 and the transverse axis of the face plate. Thus the telephone may initially be hung by passage of lugs of studs 39 which project from the telephone may be secured by advancing bolts 34 through nuts 30. Additionally and equally important key hole slots 36 also serve to position bolts 34 in alignment with nuts 30 such that by merely placing the telephone against the face plate with lugs 39 extending through key hole slots 36, nuts 30 will be aligned with bolts 34 whereby the installer may then proceed to secure bolts 34 without shifting of the telephone.

Wires designated 40 in the drawings leading to or from the telephone are housed in the triangular space 42 defined by the enclosure walls 20, 22 and the face plate 16. Extension of wires 40 through the mounting plate is provided by an enlarged aperture 44 preferably one inch in diameter provided in the upper central portion of face plate 16. Access to the wires or triangular space 42 is available at the opposite ends 17, 19 of the face plate which ends are unobstructed so as render space 42 continuous throughout the length of the mounting plate.

In addition to the above-noted advantages, it will be seen that the flanges 18 provide a secure and continuous engagement with the enclosure side walls 20, 22 so that once secured, the mounting plate is firmly positioned against movement. Additionally the unobstructed ends 17 and 19 of the mounting plate provide a continuous and unobstructed triangular compartment 42 which not only facilitates assembly of the telephone unit but moreover serves as a storage compartment for the telephone wires.

Modifications and adapation of the present invention readily apparent from the foregoing description and associated drawings, although not specifically mentioned herein, will nevertheless be included within the scope of the present invention as indicated in the appended claims.

I claim:

1. A mounting device for mounting a telephone in a corner of an enclosure or the like, the mounting device comprising a one-piece body having a substantially flat mounting face adapted to receive the rear surface of a telephone, said body having a pair of flanges extending inwardly at an angle from the opposite sides thereof and adapted to engage against opposite wall portions forming a corner of an enclosure to position the mounting face across the corner, said body having unobstructed opposite ends coinciding and being defined by the opposite ends of the mounting face so that when attached to an enclosure across a corner a through access will be provided behind the mounting device between the latter and the wall portions of the enclosure defining the corner, said flanges having a number of apertures for receiving fasteners to attach the mounting device to enclosure walls, said mounting face having a first set of apertures adjacent the opposite sides thereof to provide access for installing or removing fasteners with respect to the apertures in said flanges, and means on said body for securing a telephone against the mounting face of the plate.

2. The mounting device defined in claim 1 wherein said means includes a second set of apertures in the mounting face and a plurality of nuts respectively fixed around the second set of apertures on the rear side of the mounting face.

3. The mounting device defined in claim 2 wherein said mounting face has key slots for initially positioning and supporting the telephone prior to securement to the mounting face.

4. The mounting device defined in claim 3 wherein said mounting face has an enlarged aperture extending for receiving telephone wires.

5. The mounting device defined in claim 4 wherein said body including said flanges is integrally formed from sheet metal with said mounting face having a generally rectangular shape and said flanges being continuous and bent rearwardly at an angle of approximately forty five degrees.

6. The mounting device defined in claim 5 wherein said first set of apertures and the group of apertures in said flanges are each ten in number, said second set of apertures and their associated nuts are each eight in number, and said key slots are four in number.

7. The mounting device defined in claim 6 wherein said body is formed from eleven gauge sheet steel with the mounting face being approximately 7 inches in width and 17 inches in length and with the flanges being approximately 1¼ inches in width.

8. A telephone mounting assembly including in combination; an enclosure including wall portions meeting at and defining a corner, a mounting plate including a generally rectangular mounting portion and opposite continuous side flanges extending rearwardly from the opposite sides of the mounting portion at an angle of approximately 45 degrees, said mounting plate having a first set of apertures through its mounting portion and a second set of apertures through its flanges aligned behind said first set of apertures, fasteners received through said second set of apertures and securing said mounting plate across the corner with the respectively flanges engaging said wall portions, the mounting plate at its opposite ends being defined by the opposite ends of said mounting portion and thereby defining with said wall portions an unobstructed triangular space behind the mounting plate, a telephone, means securing the telephone to said mounting portion of the plate, said mounting portion having an enlarged aperture communicating with the triangular space and receiving wires from the telephone.

9. The assembly defined in claim 8 wherein said means securing the telephone to said mounting portion includes a number of apertures through said mounting portion and a number of nuts fixed to the mounting plate respectively around said last recited apertures.

References Cited

UNITED STATES PATENTS 2,363,816 11/1944 Svikhart ------------ 179—146

WILLIAM C. COOPER, Primary Examiner